Patented Jan. 3, 1939

2,142,269

UNITED STATES PATENT OFFICE 2,142,269

HYDRAULIC DRIVE FOR VEHICLES

Dietrich Gössler, Heidenheim-on-the-Brenz, Germany, assignor to American Voith Contact Company, Inc., New York, N. Y.

Original application December 12, 1934, Serial No. 757,243. Divided and this application September 17, 1935, Serial No. 40,936. In Germany December 11, 1933

8 Claims. (Cl. 105—96.2)

My invention relates to improvements in hydraulic drives for vehicles, and more particularly for vehicles such as railway rolling stock, in which the speed and the direction in which the vehicle is running, are subject to frequent variations.

This case is a division of application Serial No. 757,243, filed December 12, 1934.

It is an object of my invention to provide an improved drive of the kind described. To this end I provide not less than two turbine units or circuits for each direction of running.

The units or circuits may comprise only hydraulic torque transformers, or hydraulic clutches, or each unit may include a turbine torque transformer and a turbine hydraulic clutch. A torque transformer has a fixed guide apparatus in addition to a primary and a secondary blade wheel, while a clutch has only the primary and the secondary blade wheel, but no guide apparatus.

Hereinafter will be described by way of example a mechanism which includes a torque transformer and a clutch, i. e., two turbine circuits, as defined above.

Furthermore, and also by way of example, a drive for railway rolling stock will be described in which mechanism including the two turbine circuits is provided for either direction in which the vehicle, on which the two mechanisms are mounted, is to run.

In vehicles having turbine mechanisms between the engine and a driving axle of the vehicle, it is old to provide a mechanism of the kind described for each direction of running. Such mechanisms, however, were heretofore designed with one liquid circuit, i. e., with only one driving, and only one driven, blade wheel. This involves the drawback that only one range of speeds is available.

According to the invention, on the other hand, each mechanism is equipped with not less than two liquid circuits so that several speed ranges become available. The two circuits of each mechanism may be a transformer, i. e. a circuit with a driving and a driven blade wheel, and a guide apparatus, as will be described by way of example, and a clutch, i. e. a circuit with only the two blade wheels but without the guide apparatus. Or both circuits may be transformers, or clutches.

By providing a mechanism with two turbine circuits for each direction in which the vehicle runs, and for various speed ranges, the adaptability and power-transmitting capacity of the drive according to my invention are much improved. The torque transformer unit is operated for starting and on steep gradients, while the clutch unit is operated on the level and on lesser gradients.

I wish it to be understood that more than two circuits may be provided in each mechanism, but there must never be less than two circuits.

Preferably the two (or more) circuits for each direction are housed in one casing, or, better still, all circuits of the drive are housed together in the same casing.

Preferably a permanent mesh reduction gearing is inserted between the mechanisms and the driving axle, or axles, of the vehicle. By providing such gearing, the mechanisms can be made so small, even for comparatively high performances and slowly rotating driving axles, that the two circuits and the two speed ranges, which they provide, can be housed without increasing the size and the weight of the drive as compared with the known drives referred to.

In the case of a low-speed engine the two mechanisms, in order to reduce their size, are connected to the engine by a step-up gear.

The driving shaft of each mechanism is permanently connected to the engine or motor and the secondary elements of the mechanism are permanently connected to the driven shaft.

By suitably designing the several gearings referred to it is possible to standardize the mechanisms, so that mechanisms of exactly similar design may be used for forward and for backward running of the vehicle on which they are mounted, and their blade wheels may be of identical or of stereo-isometric design.

If all gearings for a given drive are housed together in one gear box, the mechanisms for both directions of running may be self-contained parts and may be secured to the gear box, which is favorable with respect to the design and simplified operation of the drive.

In the drawings affixed to this specification and forming part thereof mechanisms and drives for railway rolling stock embodying my invention are illustrated diagrammatically by way of example.

In the drawings

Fig. 1 is an axial section of mechanism comprising a torque transformer and a clutch, in which the driving and driven shafts project from opposite ends of the casing in which the transformer and the clutch are housed, Fig. 2 is an axial section of a similar mechanism in which, however, the two shafts project from the same side of the casing, Fig. 3 is an axial section of a similar mechanism in which the driving shaft extends through, and projects from opposite sides of, the casing, Figs. 4-9 are plan views of a four-wheeled railway truck illustrating the arrangement of two mechanisms according to my invention, one for forward, and the other for backward running, and an engine or motor, on the frame of the truck.

Fig. 4 shows a truck having a single driving axle, and two mechanisms of the type illustrated in Fig. 1 for driving the axle and arranged with their axes in parallel to, and at opposite sides of, the central longitudinal line of the truck, the driven shafts being connected to the driving axle by bevel gearing, Fig. 5 shows two mechanisms the arrangement of which is similar to the one illustrated in Fig. 4, but the driven shafts of which are connected to both axles of the truck by chain-and-sprocket drives, Fig. 6 shows two mechanisms of the type illustrated in Fig. 2 arranged at opposite sides of the central longitudinal line of the truck, with their two driving shafts connected to the engine by a cardan shaft, their driven shafts driving one of the axles of the truck through spur gears, Fig. 7 shows the chain-and-sprocket drive of Fig. 5 with the arrangement of mechanisms as in Fig. 6, Figs. 8 and 9 show two mechanisms of the type illustrated in Fig. 3, as arranged for a chain-and-sprocket drive and for a cardan shaft drive, respectively.

Referring to the drawings it should be noted that while I have illustrated, by way of example, a mechanism including a turbine torque transformer and a turbine clutch, my invention also relates to mechanisms including only torque transformers, or only clutches, provided that not less than two turbine units, or circuits, are provided for each direction in which the vehicle runs, i. e. not less than four turbine units or circuits in all.

Referring first to Fig. 1, A is the driving shaft and B is the driven shaft of a mechanism embodying my invention. The outer end of the driving shaft A projects from the casing C in which the mechanism is housed, and is mounted to rotate in a bearing A'' at the corresponding end of the casing C. Its inner end is supported in the driven shaft B, which is partly tubular for the reception of the inner end, and rotates in a bearing B'' at the opposite end of the casing. A primary blade wheel $a'$ is mounted on the driving shaft A near that end wall of the casing C, which supports the bearing A'' of the driving shaft. $c'$ is a guide apparatus on this end wall, and $b'$ is the secondary blade wheel. The members $a'$, $b'$ and $c'$ make up together the transformer unit W of the mechanism and are arranged at one side of a central partition C'' in the casing C.

The clutch unit K is positioned at the other side of the partition C'' and includes a primary blade wheel $a^2$ on the shaft A and a secondary blade wheel $b^2$. The secondary blade wheels $b'$ and $b^2$ are cast integral with an intermediate casing $b^3$ which is in turn integral with the driven shaft B, and is supported in the partition C'' by a central antifriction bearing, as shown in the drawings.

M is an engine or motor which imparts rotation to the driving shaft A through gearing $d$ and D'. If, as has been assumed, the engine shaft rotates faster than the driving shaft A, the gearing is of the reduction type with a pinion $d$ on the engine shaft and a spur gear D' of larger diameter on the driving shaft A. For low-speed engines the gearing must obviously be of the step-up type. The driven shaft B rotates a driving axle G of the vehicle through bevel gearing $b$ and F.

Referring now to Fig. 2, this mechanism is similar to the one illustrated in Fig. 1, but its driven shaft B is tubular throughout and equipped with a pinion $b$ meshing with a spur gear F. The driving shaft A projects from the driven shaft B beyond its pinion $b$ and is driven from the engine or motor M through bevel gearing $d$, D'.

The mechanism shown in Fig. 3 is similar to the one described with reference to Fig. 1, but the driving shaft A projects from both ends of the casing C and is equipped with clutch members $D^2$ and $D^3$ at either end. The engine or motor M drives the driving shaft A through a member $e$, and a member $f$ on the driving shaft A' of another mechanism, whose driven shaft $B^2$ carries a spur pinion $b^{22}$, connects this driven shaft $B^2$ to the member $D^3$ on the driving shaft A.

All these mechanisms, with the exception of the modified driving and driven shafts, are exactly alike in all three figures, so that the parts can be manufactured to standards and on a quantity production basis.

In Figs. 4-9, 1 is the frame and G is the driving axle of the four-wheeled truck. H' and $H^2$ are the driving wheels on this axle and G' is the other axle with wheels $H^3$ and $H^4$. 2 is a frame on the truck which supports the engine or motor M and its accessories.

C' and $C^2$ are two mechanisms similar to the mechanism shown in Fig. 1, which are equipped with driving shafts A' and $A^2$ and with driven shafts B' and $B^2$, respectively. The driven shaft A' is equipped with a pinion D', the driven shaft $A^2$ with a pinion D''. Both pinions mesh with the spur gear $d$ on the shaft of the engine M and make up a step-up gear. One of the mechanisms is designed for forward and the other for backward running of the vehicle. The mechanisms are thrown in by suitable clutching means (not shown). Bevel gears $b'$ and $b^2$ transmit the rotation of the respective driving shafts B' and $B^2$ to the bevel gears F on the driving axle G.

In the modification shown in Fig. 5 the mechanisms C' and $C^2$ are arranged as in Fig. 4, but are connected to a sprocket shaft J' through a reduction gearing including bevel wheels F, and a pinion on a lay shaft $J^4$. The sprocket shaft J' is connected to the axle G by a chain $L^1$ and to the axle G' by a chain $L^2$, so that in this case both axles of the truck are driving.

Fig. 6 shows an arrangement in which the axes of the two mechanisms C' and $C^2$ extend at right angles to the central longitudinal line of the truck and only the axle G is driven by pinions $b'$ and $b^2$ on the respective driven shafts, and by spur gears F on the driving axle which mesh with the pinions. Power is transmitted from the engine M to the driving shafts A' and $A^2$ through a cardan shaft M' and bevel gearing $d$, $d'$, $d''$.

Figure 1:
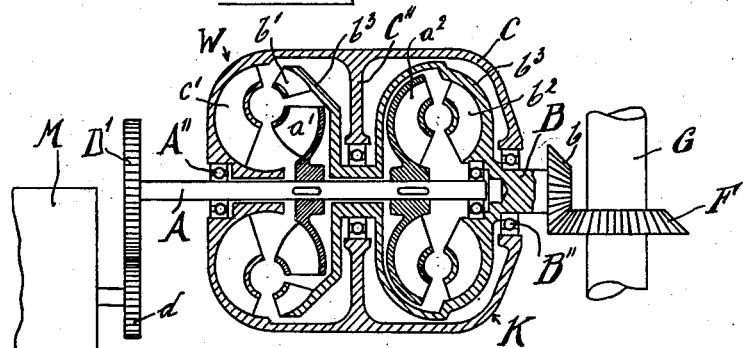
Figure 2:
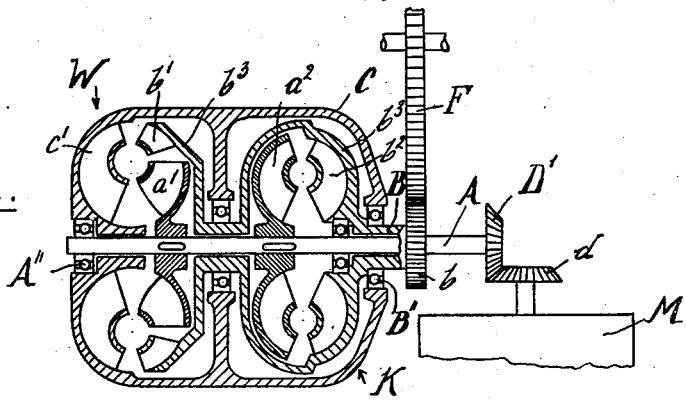
Figure 3:
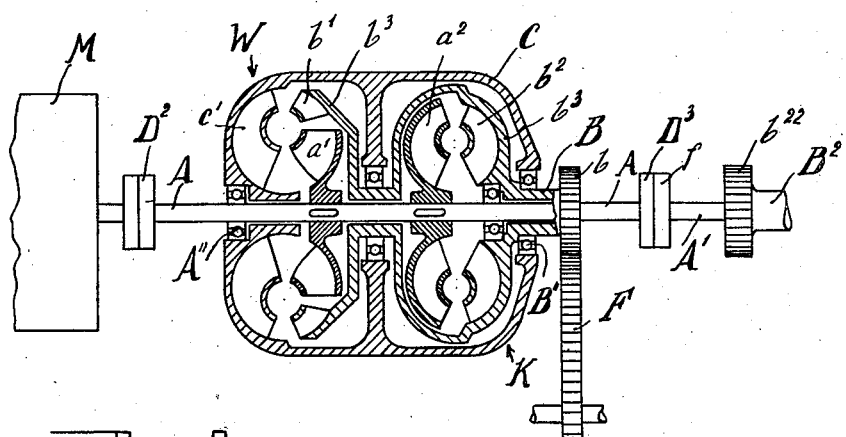
Figure 4:
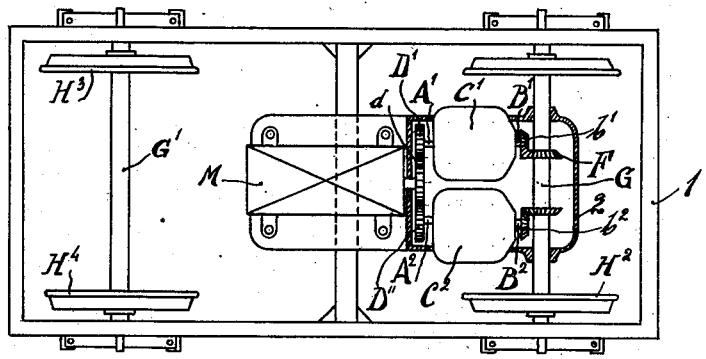
Figure 5:
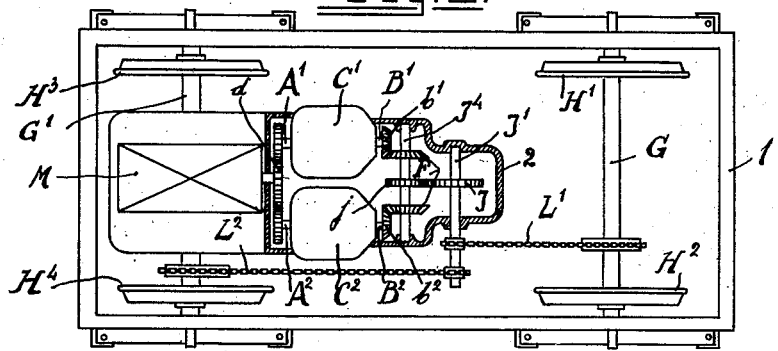
Figure 6:
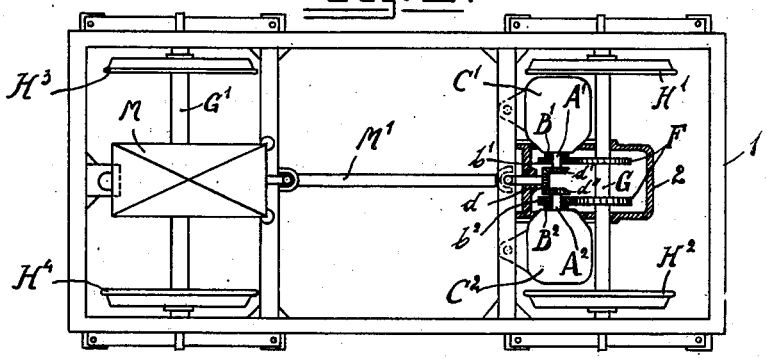
Figure 7:
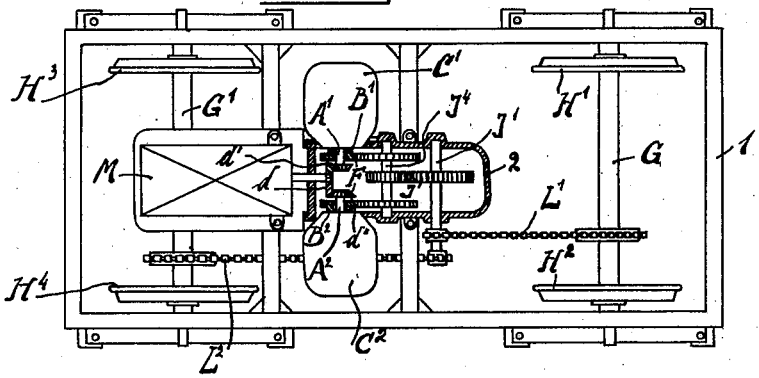
Fig. 7 shows the truck of Fig. 5 adapted to the position of the mechanisms according to Fig. 6, the only difference being that the gearing F on the lay shaft $J^4$ is of the spur gear, not of the bevel gear type.

C' and C² are arranged as shown in Fig. 3, and are connected to the axles G and G' by bevel gearing, a sprocket shaft J', and chains L' and L².

Figure 8:
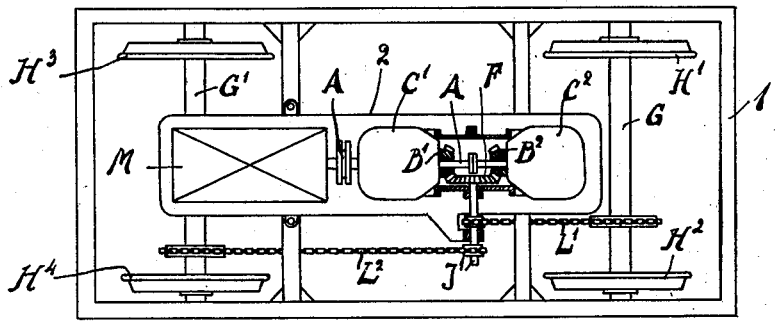
Fig. 8 shows a truck in which the mechanisms
Figure 9:
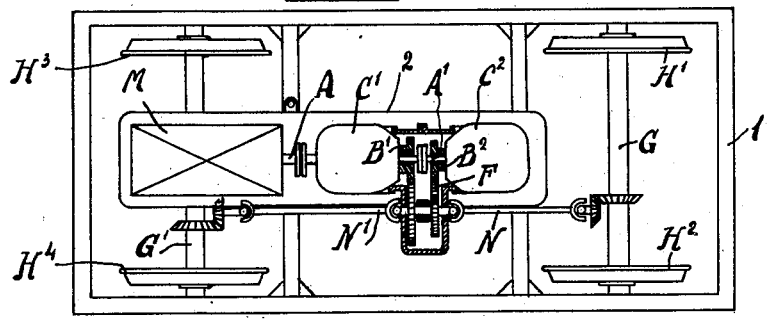

Fig. 9 shows the mechanisms C' and C² arranged as in Fig. 8, but connected to the axles G and G' by spur gears F and cardan shafts N and N'. An intermediate spur gear F" is inserted between the pinion $b^{22}$ of mechanism C² and the spur gear F on the shaft N.

It will appear from the examples illustrated that the connection of the engine or motor M to the driving shaft A, or to the driving shafts A and A', and the connection of the driving wheels of the vehicle to the driven shaft B, or driven shafts B' and B², may be modified in various ways for otherwise standardized mechanisms. The fact that turbine torque transformers are not reversible, must be considered with respect to their connection to the driving wheels.

The drives which have been illustrated, are particularly suitable for vehicles which are frequently reversed, for instance, shunting locomotives, whose speed is frequently varied.

In operation the transformer unit W is used for starting and negotiating steep gradients, while the clutch unit K is used on the level and on less steep gradients. Heretofore it has been attempted to obtain the required efficiency by designing the torque transformer for a particularly gradual ascent of the curve of efficiency, plotted against speed in revolutions per minute. Such transformers were so designed that the secondary torque available for starting and for negotiating gradients was as high as possible, by placing the top of the efficiency curve at a speed range of about one-half the upper speed limit. This results in poor efficiency for the high speed ranges, and it was eliminated by replacing the transformer by a mechanical clutch of some suitable kind. This solution is quite satisfactory for comparatively small power, for instance in road vehicles and light rail motor cars. For higher power, on the other hand, the operation of the mechanical clutch involves certain drawbacks at the higher speeds. Thus, if the engine is so powerful that the steepest gradients on a line can be negotiated at high speed, the engine has an excess of power which is wasted on the level and on lesser gradients. Now, if this engine is connected to the driving axle, or axles, by a clutch, its speed is directly determined by the speed of the vehicle and the power can only be reduced by reducing the torque. In a hydraulic transformer, on the other hand, the speed of the driving shaft A, and thereby also the speed of the engine shaft, decreases in proportion to the cube root of the power, as it does in propellers, independently of the speed of the driven shaft B, and consequently of the vehicle.

According to my invention the top of the efficiency curve lies at a vehicle speed of not less than 75% of the upper speed limit. With this arrangement the vehicle can be speeded up to the upper speed limit at full engine power as rapidly as possible and when the upper speed limit has been reached, the speed and performance of the engine are reduced to the amount just required for maintaining the highest speed of the vehicle. Consequently the engine is operated at comparatively low speed for the major part of its operation, which is very favorable for its maintenance. Another advantage of the torque transformer against the mechanical clutch is that in the case of the transformer the engine is not positively connected to the driving axle and is not entrained by the driving axle, as with a mechanical clutch, so that disturbances of any kind only cause a lowering of the engine speed, but not of the vehicle speed.

The arrangement is particularly favorable, if the blades of the primary and secondary wheels a' and b' of the transformer unit W are so designed that the ratio of the secondary and primary speeds is not less than .75 at the top of the efficiency curve. With a transformer whose blades are designed as described, and whose ratio of transmission is almost 1:1, the best hydraulic efficiencies practicable are obtained. Besides such a transformer permits of increasing the ratio of step-up for higher velocity at high efficiency.

If high tractive effort is required at comparatively low speed, for instance with shunting locomotives, the said technical advantages of the invention are fully utilized, by combining, in a manner per se known, a second turbine transformer with the first transformer in such manner that the top of its efficiency curve lies at a vehicle velocity of not more than 45% of the maximum vehicle speed. For quantity production, this second transformer is made equal and identical, or stereoisometric, to the first one, and the secondary parts of both transformers are connected to the driving axle through gear wheels of various ratios.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim in the present application to any modification not covered by these claims is expressly reserved.

I claim:—

1. In a hydraulic drive for vehicles in combination, a driving axle, an engine whose axis is arranged transversely to the driving axle, two mechanisms arranged with their axes in parallel relation to the axis of the engine, each of which mechanisms includes two turbine circuits, one of said mechanisms being designed for forward, and the other for backward running of the vehicle, spur gearing for operatively connecting said engine to said mechanisms, and bevel gearing for operatively connecting said mechanisms to said driving axle.

2. In a hydraulic drive for vehicles in combination, a driving axle, an engine whose axis is arranged transversely to the driving axle, two mechanisms arranged with their axes in parallel relation to the axis of the engine, each of which mechanisms includes two turbine circuits, one of said mechanisms being designed for forward, and the other for backward running of the vehicle, spur gearing for operatively connecting said engine to said mechanisms, and reduction gearing including bevel and spur gears for operatively connecting said mechanisms to said driving axle.

3. In a hydraulic drive for vehicles in combination, a driving axle, an engine whose axis is arranged transversely to the driving axle, two mechanisms arranged with their axes in parallel relation to the axis of the engine, each of which mechanisms includes two turbine circuits, one of said mechanisms being designed for forward, and the other for backward running of the vehicle, spur gearing for operatively connecting said engine to said mechanisms, and gearing including spur gears and spur pinions for operatively connecting said mechanisms to said driving axle.

4. In a hydraulic drive for vehicles in combination, means for propelling a vehicle, an engine, two mechanisms each including a driving shaft and a driven shaft, a turbine torque transformer unit comprising a primary blade wheel on said driving shaft, a guide apparatus, and a secondary blade wheel operatively connected to said driven shaft; and further including a turbine clutch unit comprising another primary blade wheel on said driving shaft, and another secondary blade wheel also operatively connected to said driven shaft, said driving shaft being smaller in diameter than said driven shaft and extending axially into a cavity of said driven shaft, means for operatively connecting the driving shafts of both mechanisms to said engine, and means for operatively connecting the driven shafts of both mechanisms to said propelling means.

5. In a hydraulic drive for vehicles in combination, means for propelling a vehicle, an engine, two mechanisms each including a driving shaft and a tubular driven shaft, a turbine torque transformer unit comprising a primary blade wheel on said driving shaft, a guide apparatus, and a secondary blade wheel operatively connected to said driven shaft; and further including a turbine clutch unit comprising another primary blade wheel on said driving shaft, and another secondary blade wheel also operatively connected to said driven shaft, said driving shaft being inserted in said driven shaft in co-axial relation thereto, and projecting from one end of the driven shaft, means for operatively connecting the projecting ends of the driving shafts of both mechanisms to said engine, and means for operatively connecting the driven shafts of both mechanisms to said propelling means.

6. In a hydraulic drive for vehicles in combination, means for propelling a vehicle, an engine, two mechanisms each including a driving shaft and a driven shaft, a turbine torque transformer unit comprising a primary blade wheel on said driving shaft, a guide apparatus, and a secondary blade wheel operatively connected to said driven shaft; and further including a turbine clutch unit comprising another primary blade wheel on said driving shaft, and another secondary blade wheel also operatively connected to said driven shaft, said driving shaft being smaller in diameter than said driven shaft and extending axially into a cavity of said driven shaft, means for operatively connecting the driving shafts of both mechanisms to said engine, and means for operatively connecting the driven shafts of both mechanisms to said propelling means, said turbine torque transformer unit being so designed that the top of its efficiency curve corresponds to not less than 75% of the maximum vehicle speed.

7. In a hydraulic drive for vehicles in combination, means for propelling a vehicle, an engine, two mechanisms each including a driving shaft and a driven shaft, a turbine torque transformer unit comprising a primary blade wheel on said driving shaft, a guide apparatus, and a secondary blade wheel operatively connected to said driven shaft; and further including a turbine clutch unit comprising another primary blade wheel on said driving shaft, and another secondary blade wheel also operatively connected to said driven shaft, said driving shaft being smaller in diameter than said driven shaft and extending axially into a cavity of said driven shaft, means for operatively connecting the driving shafts of both mechanisms to said engine, and means for operatively connecting the driven shafts of both mechanisms to said propelling means, said turbine torque transformer unit being so designed that the top of its efficiency curve corresponds to not less than 75% of the maximum vehicle speed, and the blades of said blade wheels being so designed that at the top of the efficiency curve the ratio of the secondary and primary velocities is not less than .75.

8. In a hydraulic drive for vehicles, in combination, a driving axle, an engine having its shaft arranged transversely to the driving axle, two mechanisms associated with said engine and a driving shaft in each of said mechanisms arranged in parallel relation to said engine shaft, means operatively connecting the driving shafts of both mechanisms with said engine shaft, each of said mechanisms including two turbine circuits designed for different speeds, one of said mechanisms being designed for forward and the other for backward running of the vehicle, and a reduction gear for operatively connecting said mechanisms to said driving axle.

DIETRICH GÖSSLER.